United States Patent [19]

Franke

[11] Patent Number: 4,893,782

[45] Date of Patent: Jan. 16, 1990

[54] METALLIC SEAT FOR FLUID VALVE

[75] Inventor: Charles G. Franke, Hilltown, Pa.

[73] Assignee: Emerson Electric Co., St. Louis, Mo.

[21] Appl. No.: 173,991

[22] Filed: Mar. 28, 1988

[51] Int. Cl.⁴ .............................................. F16K 1/36
[52] U.S. Cl. ..................................... 251/356; 251/333
[58] Field of Search ................. 251/356, 331, 84, 175, 251/333

[56] References Cited

U.S. PATENT DOCUMENTS

| 587,704 | 8/1897 | Clayton . | |
|---|---|---|---|
| 1,399,459 | 12/1921 | Bird . | |
| 2,936,154 | 5/1960 | von Platen et al. | 251/332 |
| 3,482,588 | 12/1969 | Kreuter | 137/85 |
| 4,088,301 | 5/1978 | Ehmig | 251/334 |
| 4,325,399 | 4/1982 | Frick | 137/85 |
| 4,368,755 | 1/1983 | King | 137/512.3 |
| 4,532,951 | 8/1985 | Fermanich | 137/84 |

FOREIGN PATENT DOCUMENTS 12461 of 1904 United Kingdom ................ 251/356

OTHER PUBLICATIONS

Olin Ph.D., John G., "Process Gas Mass Flow Controllers-Part I, An Overview", Sierra Instruments (1986).

Primary Examiner—Arnold Rosenthal
Attorney, Agent, or Firm—Kinney & Lange

[57] ABSTRACT

A fluid control valve used in a flow controller has an actuator for controlling the spacing of a valve seat that cooperates with a surface surrounding an orifice in a valve body. The actuator is modulated to regulate the spacing of the seat from the valve body orifice to control flow through the orifice, and to create a seal when desired. The valve seat has a thin metallic sealing disc, compatible with the fluid being controlled that is supported with a fluid, preferably a substantially incompressible fluid, such as a silicon oil, so the disc can conform to surface irregularities and misalignments of the mating surface. The fluid filling will displace or compress to permit the sealing disc to conform to the seat and effect a seal at relatively low valve forces.

6 Claims, 1 Drawing Sheet

U.S. Patent  Jan. 16, 1990  4,893,782
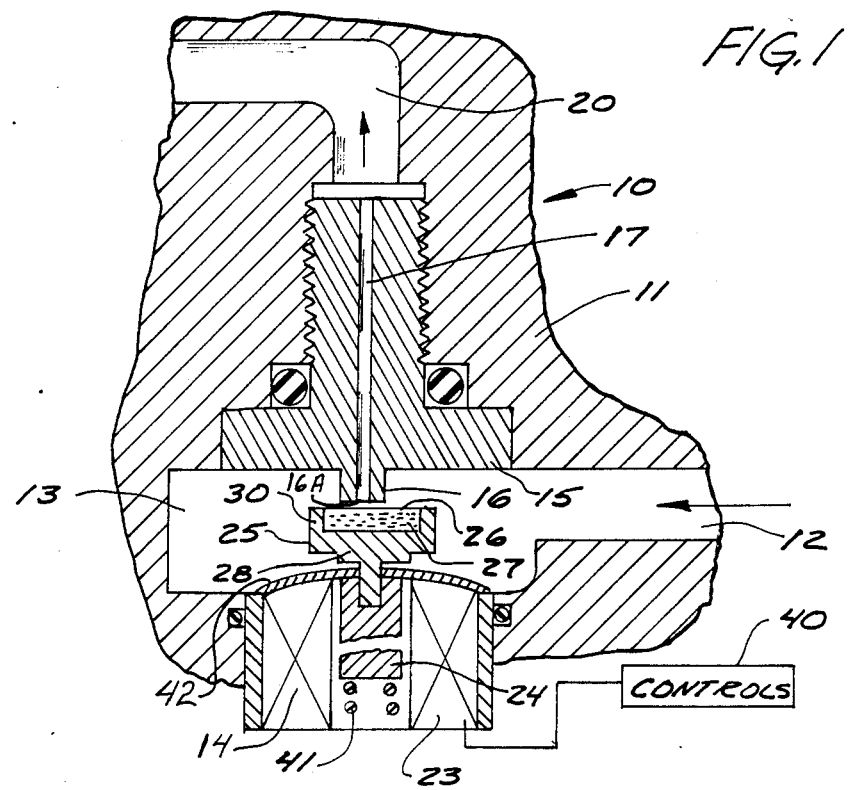
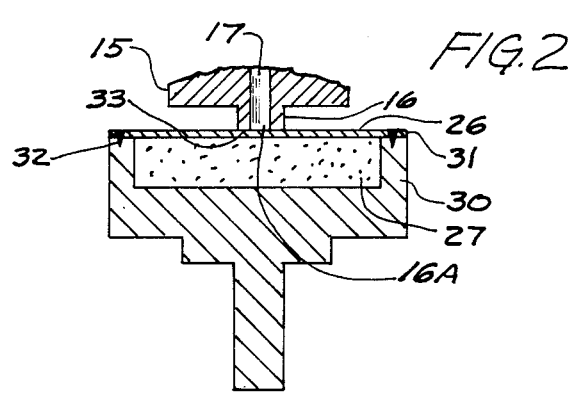
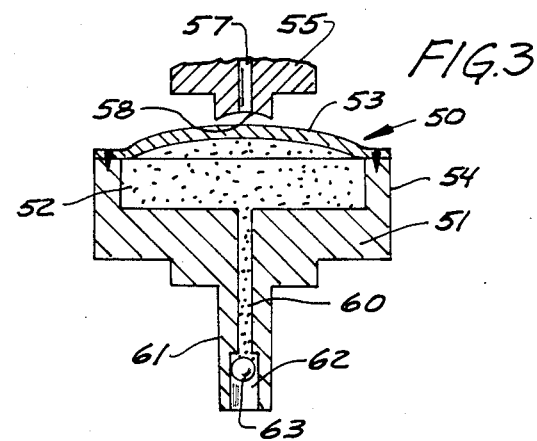
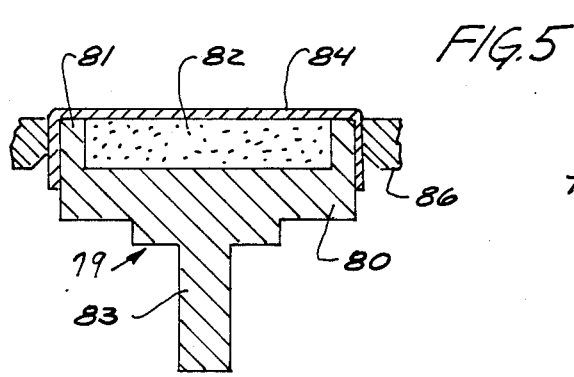
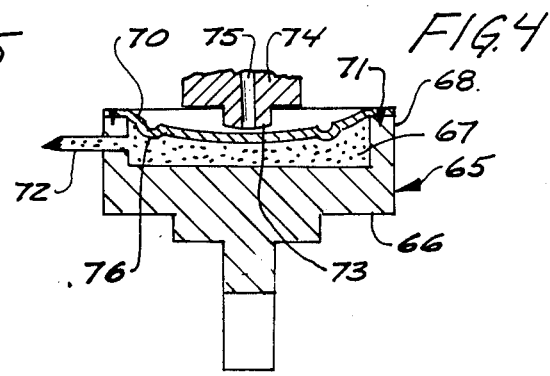

METALLIC SEAT FOR FLUID VALVE

BACKGROUND OF THE INVENTION

1. Field of the Invention

The present invention relates to metallic seals for fluid flow control valves.

2. Description of the Prior Art

Flow control valves, such as servocontrolled valves for mass flow controllers, have movable valve heads which commonly carry an elastomeric disc or seal. The valve head moves relative to an end surface of a valve body that has an orifice in it, to control flow through the orifice and to seat on the valve body to completely stop flow. Elastomeric or plastic seal materials are limited in application because of incompatibility of the seal material with the fluid medium. In some instances solid metal discs have been used for valve heads, which solves the compatibility problem but does not allow complete shut-off unless very large forces are used for seating the valve head.

SUMMARY OF THE INVENTION

The present invention relates to a valve head that replaces existing heads for flow control valves and which uses a thin relatively flexible metal disc for a seal member. The thin metal disc or diaphragm overlies a chamber filled with a fluid which provides a conformable support for the disc. The thin metal disc is able to conform to the surface surrounding the orifice to be closed off when necessary, while providing flow control for metering flow through the orifice. The conformability of the thin disc and backing fluid (preferably liquid) permits sealing of an orifice in a mating valve body without using excessive closing forces.

The valve head can be constructed in a variety of ways. At rest, the thin metal disc can be substantially planar, convex or concave and still operate to provide a seal when necessary because of the ability of the fluid to flow within the closed chamber and yet provide adequate backing for the thin metal disc. Slight irregularities to which the disc must conform are accomodated for sealing without taking a permanent set or without permanently compressing. The valve head life and reliability are both increased because of the ability to use metals that do not deteriorate from contact with the fluids being controlled.

BRIEF DESCRIPTION OF THE DRAWINGS

FIG. 1 is a fragmentary sectional view through a typical valve assembly, showing a valve body in place in a fluid flow passageway, and a valve head made according to the present invention;

FIG. 2 is an enlarged fragmentary sectional view of the valve head and a valve body shown in FIG. 1;

FIG. 3 is a sectional view of a modified form of the invention showing a different configuration for the metal disc forming the valve seal surface;

FIG. 4 is a sectional view of a further modified form of the present invention; and FIG. 5 is a sectional view showing a modified construction of a metal disc and valve head housing according to the present invention.

DETAILED DESCRIPTION OF THE PREFERRED EMBODIMENTS

Referring to FIG. 1, which is a schematic representation, a solenoid valve indicated generally at 10 has a main valve block 11, in which an input passageway 12 is formed, which leads to a valve chamber 13. The valve chamber 13 in turn mounts a valve body 15, which is suitably threaded in place, and which has a neck 16 extending into chamber 13. Neck 16 has an orifice 16A therein leading to a passageway 17 that extends through the valve body 15. The passage way 17 is open to an outlet passageway 20 in the valve block.

Flow through the orifice 16A and passageway 17 is controlled by a servovalve actuator 23, which has a central actuator 24 driven by a coil 14. Valve head assembly 25 is installed on actuator 24 at an end that extends into the chamber 13. The head assembly 25 and servovalve actuator 23 is sealed where it extends through the valve block into the valve chamber 13 with a suitable seal diaphragm 42 that permits the valve head assembly to slide along its central axis. The central axis of the valve head assembly aligns with the axis of passageway 17.

The valve head assembly 25 has a valve head housing 28. A chamber 27 is formed on an end of housing 28 adjacent to and facing the valve body 15. A thin metal sealing disc or diaphragm 26 overlies an open end of chamber 27. The chamber 27 is defined by an annular wall portion 30 that has an outer edge surface 31 on which the thin metal disc 26 is sealingly mounted as shown at 32. The chamber is thus preferably enclosed. The disc 26 can be welded to the edge surface 31 of wall 30 with a continuous weld. The chamber 27 is filled with a fluid, preferably a substantially incompressible fluid (a suitable oil), and as shown in FIGS. 1 and 2 the disc 26 is substantially planar, so that it will seal against a surface 33 (FIG. 2) of the neck 16 that surrounds the orifice 16A leading to passageway 17.

The actuator 24 is acted on by a spring 41 which tends to urge the valve head assembly 25 toward the valve body 15, to thereby tend to seal the disc 26 against the surface sealing or valve seat surface 33 of neck 16 surrounding the orifice 16A. The position of the valve head assembly is controlled by current to the actuator 23 from controls 40. The position of the valve head disc 26 controls the effective size of the flow path to passageway 17 and thus controls the flow from the inlet passageway 12 to the outlet passageway 20.

The filling of fluid in chamber 27 provides support for the thin metal disc 26, so that it is backed adequately for providing sealing forces on the surface 33 on the end of neck 16 that surrounds the passageway 17. If the fluid filling is compressible, it can be adjusted as to pressure if desired to provide adequate backing pressure. If sealing surface 33 is slightly cocked, or not directly aligned, or has a rough surface or a surface irregularity, the disc 26 can still deflect to conform to the sealing surface 33. If a substantially noncompressible fluid is used, the volume of the substantially non-compressible fluid (oil) will remain constant, and while being able to flow it provides an adequate backing so that reasonable force can be applied for sealing, even though portions of the disc 26 may deflect in from a planar position. When a compressible fluid is used, the deflection of the disc 26 will increase the pressure in chamber 27 to provide backing pressures. The disc 26 may be made of a suitable alloy metal and while the thickness can be varied to suit existing conditions and valve seat diameters, a disc thickness of about 0.003–0.005 inches has been found satisfactory.

FIG. 3 shows a modified form of the invention comprising a valve head assembly 50 that includes a valve head housing 51 having a chamber 52 defined therein, and a thin metal disc or diaphragm 53 sealingly mounted on the annular wall portion 54 defined around the chamber 52. In this case, the disc 53 forms a convex outer surface facing the valve body with which it is used. The convex shape is maintained by providing an adequate filling of incompressible fluid in the chamber 52 or pressurized compressible fluid sufficient to support the disc, as shown. The valve body shown at 55 has a passageway 57 therein and has a concave seal surface 58 which generally conforms to and faces the convex outer surface of the disc 53.

In this form of the invention, the filling of fluid (oil) in the chamber 52 is provided through a fill passageway 60 in the valve head housing opening to the chamber 52, and passing through a housing mounting tang 61. The passageway 60 has an enlarged neck portion 62 at its outer end, and a sealing plug means, as shown a steel ball 63, can be forced, with a press fit, into this neck so that it seals the passageway 60, and the chamber 52 after the fluid (preferably oil) has been filled into the chamber 52 and passageway 60. If the chamber 52, passageway 60 and neck 61 are filled full initially, pressing the steel ball 63 inwardly, to the position shown, changes the pressure of any fluid for filling and particularly where an oil is used, this insures that the disc 53 will bow outwardly the desired amount. The effective support level of the disc on the fluid thus can be modified after the initial filling.

The valve head assembly works in the same manner as the form in FIGS. 1 and 2, and utilizes a metal-to-metal seal between the convex outer surface of the thin metal disc 53 and the concave seal surface 58 of the valve body 55. The metal-to-metal seal is effected easily, and positively. Likewise, the control of the effective opening to the passageway 57 is controlled utilizing a servoactuator system such as that shown in FIG. 1.

FIG. 4 shows a further modified valve head assembly 65, which comprises a valve seat housing 66 that has an interior chamber 67 defined at one end by an annular wall 68. The chamber 67 has a thin metal disc or diaphragm 70 thereover, which is sealed with a suitable peripheral weld to the outer edge surface of the wall 68, as shown at 71.

A fill tube 72, accessible from the exterior of the valve seat housing, is provided in a passageway leading to the chamber 67. The fill tube 72 is used to fill fluid into the chamber 67 to a desired level, and then the fill tube 72 is pinched off and sealed in a manner that is normally used for filling isolation cavities in differential pressure sensors.

In this form of the invention, the thin metal disc 70 has an outer surface supported in a concave shape. The concave outer head surface of its 70 is the seal surface mating with a convex end seal surface 73 of a valve body 74. The valve body 74 has a passageway 75 therein which can be closed off by the metal-to-metal seal between the surface 73 and the concave outer surface of the thin metal disc 70.

The disc 70 has an annular convolution or corrugation 76 which may be provided to accomodate fill volume variation, particularly for extreme temperature-induced variations when using a noncompressible fluid.

A modified form of the attachment of a metal disc or diaphragm onto a valve head housing is shown in FIG. 5. The valve head assembly 79 includes a valve head housing indicated generally at 80, which has an annular wall 81 that surrounds a central chamber 82. The housing 80 has a tang 83 for attaching to an actuator, for use with a servovalve, and as shown a formed thin metal seal cup 84 is placed over the annular wall 81. The cup 84 is of larger diameter than the ourside diameter of wall 81 so it overhangs the wall 81 around the periphery. A metal retainer ring 86 is slid over the edge portions of the disc 84 so that the edge portions are compressed and are sealed against the outer surface of the annular wall 81. The retainer ring 86 can be left in place on the valve housing 80 for use.

The retainer ring 86 can be shrunk onto the valve housing to hold the cup 84 in place after the filling of fluid has been filled into the chamber 82. The chamber 82 is thus enclosed or sealed as are the chambers in the first form of the invention.

In all forms of the invention shown, metal-to-metal seals can be effected against the valve body without permanent set or compression of the seal member on the head, such as occurs with elastomeric seals, and without using the large closing force that is required for sealing if a thick metal washer is utilized in the place of an elastomeric washer. The fluid in the chamber provides support on the inner surface of the metal disc so it will bear against the seal surface with enough force to provide an adequate seal, and yet the disc will deflect and conform enough so that excessive closing force is not required. The use of noncompressible fluid is preferred because the support for the metal disc is achieved without substantial deflection.

The disc can have convolutions formed in it, such as those used in pressure sensing diaphragms, as shown in FIG. 4, to permit disc deflection to accomodate volume changes in noncompressible filling fluid caused by temperature changes.

The thin disc can also be sealed to the valve head housing with adhesives or other known sealing means. The fluid chamber can be formed in different ways, for example, by machining a recess in the end of a body and covering the recess with the thin disc, after filling the recess with oil.

Although the present invention has been described with reference to preferred embodiments, workers skilled in the art will recognize that changes may be made in form and detail without departing from the spirit and scope of the invention.

What is claimed is:

1. A valve head for controlling flow relative to a valve body that has a sealing seat surface for controlling flow through a passageway in the valve body, said valve head comprising a valve head housing, a chamber formed in said valve head housing and having an open side surrounded by a peripheral rim that has an outer edge defining a plane, in substantially planar metal disc overlying said open side and resting on the edge of the peripheral rim, and being sealed with respect to said peripheral rim of said valve head housing to enclose said chamber, and a filling of flowable, substantially non-compressible fluid in said chamber selected for providing support for the disc across the side of the means facing said chamber and relative to the valve head housing.

2. The apparatus as specified in claim 1 wherein said disc has a thickness in the range of 0.003 inches.

3. The apparatus of claim 1 wherein the disc is welded around its periphery to the peripheral rim of the valve head housing to enclose the chamber means.

4. In a fluid control valve having a passageway comprising an inlet and an outlet, and a valve body mounted in said passageway between the inlet and outlet, said valve body having a valve passageway therein and having a valve seat surface surrounding said passageway, the improvement comprising a valve head movably mounted with respect to such valve body and seat surface surrounding a passageway in such valve body, including a valve body housing having a rim, the rim having a rim edge defining a plane and defining a chamber on a side of the valve head facing toward such valve body, a planar thin metal disc overlying and enclosing said chamber, said disc resting on the planar edge of the rim and providing an outer surface aligning with the seat surface on such valve body, and a filling of substantially non-compressible fluid in the chamber to support the disc on said non-compressible fluid against forces on the outer surface of the disc when the valve head is moved to engage the seat surface of such valve body.

5. The apparatus as specified in claim 4 wherein said metal disc has a thickness in the range of 0.003 inches.

6. The apparatus as specified in claim 4 wherein said valve head housing is mounted on an actuator, and means for controlling the actuator to control the position of the valve seat housing relative to such valve body.

* * * * *

UNITED STATES PATENT AND TRADEMARK OFFICE
CERTIFICATE OF CORRECTION

PATENT NO. :  4,893,782

DATED     :  January 16, 1990

INVENTOR(S) :  Charles G. Franke

It is certified that error appears in the above-identified patent and that said Letters Patent is hereby corrected as shown below:

Column 3, line 48, delete "seat" and insert --head--

Column 4, line 55, delete "in" and insert --a--.

Signed and Sealed this

First Day of January, 1991

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,893,782

DATED : January 16, 1990

INVENTOR(S) : Charles G. Franke

It is certified that error appears in the above-identified patent and that said Letters Patent is hereby corrected as shown below:

Column 2, line 7, delete "passage way" and insert --passageway--.

Column 4, line 6, delete "ourside" and insert --outside--.

Column 6, line 11, delete "seat" and insert --head--.

Signed and Sealed this

Fourteenth Day of May, 1991

*Attest:*

HARRY F. MANBECK, JR.

*Attesting Officer*      *Commissioner of Patents and Trademarks*